Patented Jan. 5, 1943

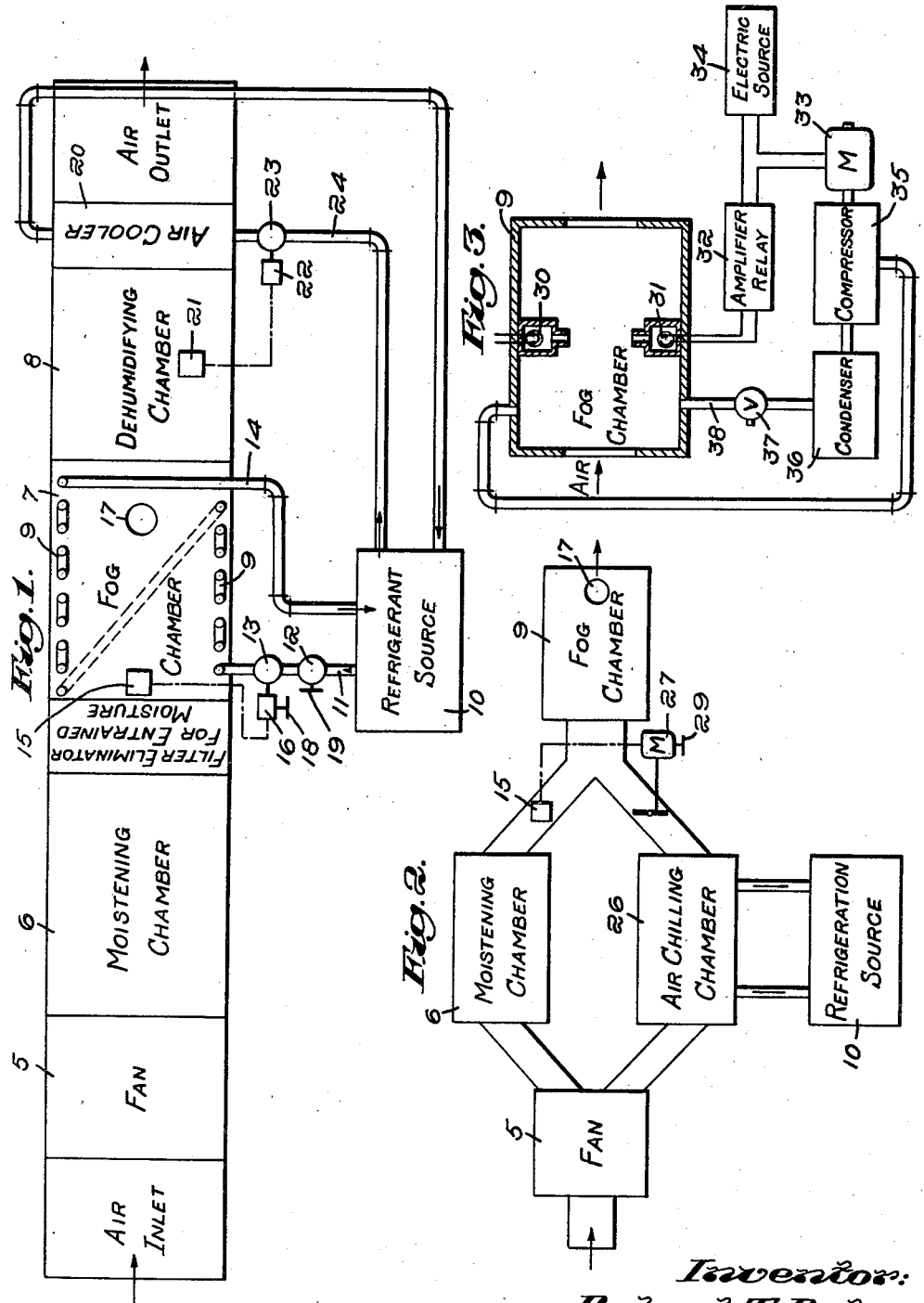

2,307,292

UNITED STATES PATENT OFFICE 2,307,292

AIR CONDITIONING SYSTEM UTILIZING REFRIGERATION

Robert T. Palmer, Sharon, Mass., assignor to B. F. Sturtevant Company, Boston, Mass.

Application August 17, 1940, Serial No. 352,997

2 Claims. (Cl. 261—9)

This invention relates to air conditioning systems utilizing refrigeration and provides through refrigeration, the simultaneous cooling and cleaning of air.

To provide proper air conditions in an air conditioning system involves more than air movement and adjustment of the temperature and humidity of the air. For the apparatus ordinarily used for moving the air and adjusting its temperature, does not clean it properly; does not sterilize it, and does not remove objectionable odors. For additionally cleaning the air electrostatic precipitators are used; for sterilizing the air ultraviolet lamps are used, and for removing odors, ozone producing devices are used.

This invention accomplishes proper cleaning, sterilizing and odor removal through the use of the refrigeration apparatus forming a part of a standard air conditioning system.

Water vapor persists as water vapor in clean air but moisture is readily condensed from air containing water vapor if solid particles are suspended in the air, and the air is chilled to approximately its dew point temperature, at which time the moisture condenses upon the solid particles and falls out from the air in the form of rain. The temperature at which this action takes place is fairly critical for if the temperature of the air is reduced low enough the moisture will condense out even if there are no solid particles upon which the moisture can condense. However the conditions are right for the moisture to condense upon solid particles suspended in the air, when the temperature is reduced to the point at which fog forms at which point the temperature will be at or near the dew point temperature of the air.

This invention adds what may be termed a "fog" or "cloud" chamber to an air conditioning system utilizing refrigeration for air cooling, and utilizes the refrigeration apparatus for producing a fog in said chamber whereby the solid particles suspended in the air entering the chamber are removed in the form of rain. The air to be treated is first moistened in an air washer, by the introduction of steam or otherwise; the larger solid particles in the air are removed by the washing action and by filters; the entrained moisture is removed and the air then enters the fog chamber where its temperature is reduced to the fog forming point and held there so that fog persists in the fog chamber at all times. Water droplets form upon the solid particles, including organic odor particles and bacteria, suspended in the air in the fog chamber and fall out of the air in the form of rain. The air then may be chilled in a following step to the temperature at which it is to be supplied in the space served, in which additional step the air may be chilled sufficiently for any desired dehumidification to take place and the air then reheated if desirable.

An object of the invention is to clean air by refrigeration.

A more definite object of the invention is to utilize the refrigeration apparatus of an air conditioning system for removing the very small solid particles suspended in the air.

The invention will now be described with reference to the drawing, of which:

Fig. 1 is a diagrammatic view of an air conditioning system embodying this invention;

Fig. 2 is a diagrammatic view of another embodiment of the invention, and

Fig. 3 is a diagrammatic view of a photo-electric control which may be used for maintaining a fog in the fog chamber of Fig. 1.

Referring now to Fig. 1, the fan 5 moves the air to be conditioned through the moistening chamber 6, the fog chamber 7, the dehumidifying chamber 8, and discharges it into the space served.

The moistening chamber 6 may be an air washer of the type disclosed in the R. E. Keyes Patent No. 2,199,632 of May 7, 1940 which is particularly suitable for cleaning the air of the larger solid particles carried thereby, and for eliminating entrained moisture. It is not necessary that the spray water be refrigerated as refrigeration is employed in following steps. The spray water may be refrigerated though if desired, or it may be warm water, or steam may be used.

The fog chamber 7 may contain the rows of refrigerant tubes 9 placed along opposite sides thereof and supplied by refrigerant from the source 10 through the pipe 11, the adjustable valve 12 and the thermostatically controlled valve 13, the refrigerant being returned to the source 10 through the pipe 14.

The dew point thermostat 15 responds to changes in the dew point temperature of the air entering the fog chamber 7 and adjusts the valve motor 16 of the valve 13 for varying the temperature of the tubes 9, conformably therewith. Since the air entering the fog chamber may be saturated, the thermostat 15 then may be a wet bulb thermostat.

A port 17 is provided for observation within the fog chamber, the interior of which may be illuminated so that the formation of fog may be observed. The valve 16 may be adjusted by hand control 18 to bias it for causing it to maintain a fog producing temperature in the chamber 9. The wheel 19 of the hand operated valve may be adjusted for controlling the supply of refrigeration to the tubes so that operation of the thermostat 15 will, through observation through the port 17, maintain the desired fog density in the chamber 9. Or the thermostat 15 may be biased to accomplish this.

Moisture will condense upon the small solid particles suspended in the air in the fog chamber, and the droplets so formed will fall into the sump of the chamber 9 from which they may be drained into a sewer. The above described controls may be adjusted for providing the proper fog density for accomplishing this.

The air leaving the fog chamber may or may not have the desired low temperature and dew point and so the dehumidifying chamber 8 is provided for chilling the clean air. This chamber contains the refrigeration coil 20 and the refrigeration supplied by the source 10 to the coil may be controlled by the dew point thermostat 21 which adjusts the motor 22 of the valve 23 in the refrigerant supply pipe 24. The thermostat 21 may be set to maintain a predetermined dew point temperature below that of the dew point temperature of the air entering the chamber 8 for providing the desired degree of dehumidification.

In the embodiment of Fig. 2, the chilling of the air in the fog chamber for the production of fog, is accomplished by mixing warm moist air from the chamber 6 with chilled air from the air chilling chamber 26. The volume of chilled air is controlled by the thermostat 15 which adjusts through the motor 27, the position of the damper 28. The motor 27 may be biased by the hand control 29 for causing it to act to maintain the desired fog in the chamber 9.

The control of Fig. 3 utilizes a photo-electric cell for maintaining a fog in the fog chamber 9. The light source 30 is placed at one side of the chamber 9, and the photo-electric cell 31 is placed at its opposite side. The source 30 projects a light beam across the chamber 9 to the photo-electric cell and when the light beam is interrupted by the presence of fog of the proper density, the cell 31 acts through the amplifier-relay 32 to disconnect the compressor motor 33 from the electric source 34, thus shutting down the compressor 35 and its supply of refrigeration through the condenser 36, the expansion valve 37, and the pipe 38, to evaporator tubes in the chamber 9.

Instead of using the separate compressor of Fig. 3, the photo-electric cell could act to open and close the valve 13 in the refrigerant supply pipe 11 in the embodiment of Fig. 1. Likewise the photo-electric cell control could act in the embodiment of Fig. 2 to adjust the damper 28 towards closed position when fog of the desired density appears in the fog chamber.

The controls illustrated are well known to those skilled in the art and so have not been described in detail herein. They may be actuated electrically, by compressed air or hydraulically as such controls are readily available.

The refrigeration source employed may be a compressor-condenser combination utilizing any well known volatile refrigerant or may be any other suitable source employing if necessary, a pump. The cooling effect may be controlled by compressor control, by mixing valves or in any other well known manner.

This invention is applicable to winter as well as summer air conditioning. In a winter conditioning system, the dehumidifying chamber 8 would be unnecessary.

While the invention has been described as embodied in an air conditioning system, it could of course be used alone in a cleaning system complete in itself, as illustrated for example, by Fig. 3. The controls of Figs. 1 or 2 could be used in substitution for or complementary to the photo-electric control of Fig. 3.

While embodiments of the invention have been described for the purpose of illustration, it should be understood that the invention is not limited to the exact apparatus and arrangement of apparatus illustrated as modifications thereof may be suggested by those skilled in the art, without departure from the essence of the invention.

What is claimed is:

1. An air conditioning system comprising an air moistener, a fog chamber for receiving air from said moistener, a source of refrigeration connected to said chamber for chilling the air therein, and means including means responsive to changes in the dew point temperature of the air entering said chamber for regulating the refrigeration from said source to maintain a fog in said chamber by decreasing the refrigeration upon increase in the dew point temperature and by increasing the refrigeration upon decrease in the dew point temperature.

2. An air conditioning system comprising an air moistener, a fog chamber for receiving air from said moistener, a source of refrigeration connected to said chamber for chilling the air therein, and means including photo-electric means responsive to the presence of fog in said chamber for regulating the refrigeration from said source to maintain a fog in said chamber by decreasing the refrigeration when fog appears and by increasing the refrigeration when no fog is present.

ROBERT T. PALMER.